US008918093B2

(12) United States Patent
Parmar et al.

(10) Patent No.: US 8,918,093 B2
(45) Date of Patent: Dec. 23, 2014

(54) USER INITIATED VIRTUAL MOBILE MANAGEMENT

(75) Inventors: Ramesh Parmar, Scotch Plains, NJ (US); Deepak Gonsalves, Union, NJ (US); Deepa Jagannatha, Somerset, NJ (US)

(73) Assignee: AetherPal Inc., South Plainfield, NJ (US)

( * ) Notice: Subject to any disclaimer, the term of this patent is extended or adjusted under 35 U.S.C. 154(b) by 334 days.

(21) Appl. No.: 13/426,042

(22) Filed: Mar. 21, 2012

(65) Prior Publication Data

US 2012/0289219 A1 Nov. 15, 2012

Related U.S. Application Data (63) Continuation-in-part of application No. 12/550,742, filed on Aug. 31, 2009, now abandoned.

(51) Int. Cl.
*H04M 3/00* (2006.01)
*H04W 24/02* (2009.01)
*H04M 3/523* (2006.01)
*H04M 3/42* (2006.01)
*H04M 3/493* (2006.01)
*H04W 76/02* (2009.01)
*H04W 88/18* (2009.01)

(52) U.S. Cl.
CPC .......... *H04W 24/02* (2013.01); *H04M 3/42382* (2013.01); *H04M 3/493* (2013.01); *H04M 3/523* (2013.01); *H04M 3/5237* (2013.01); *H04M 2207/18* (2013.01); *H04W 76/02* (2013.01); *H04W 88/18* (2013.01)
USPC ......... 455/419; 455/414.1; 455/420; 455/418

(58) Field of Classification Search
CPC ....... H04W 8/22; H04W 4/001; H04W 12/08; H04W 42/02; H04W 76/02; H04W 88/18; H04L 63/0272; H04M 2203/053; H04M 3/42178; H04M 1/72525; H04M 2203/1016
USPC ...................................... 455/414.1, 418–420
See application file for complete search history.

(56) References Cited

U.S. PATENT DOCUMENTS

| | | | |
|---|---|---|---|
| 6,826,194 B1 | 11/2004 | Vered et al. | |
| 7,146,129 B2 | 12/2006 | Bostrom et al. | |
| 7,565,141 B2 | 7/2009 | Macaluso | |
| 8,060,074 B2 * | 11/2011 | Danford et al. | 455/419 |
| 8,655,340 B2 * | 2/2014 | Sherman | 455/419 |
| 2005/0245249 A1 * | 11/2005 | Wierman et al. | 455/419 |
| 2006/0068861 A1 | 3/2006 | Triestram et al. | |
| 2006/0075076 A1 | 4/2006 | Sinha | |
| 2007/0174520 A1 * | 7/2007 | Moon | 710/62 |
| 2009/0143059 A1 * | 6/2009 | Britt et al. | 455/419 |
| 2011/0053583 A1 | 3/2011 | Parmar et al. | |

* cited by examiner

Primary Examiner — Olumide T Ajibade Akonai
(74) Attorney, Agent, or Firm — Volpe and Koenig, P.C.

(57) ABSTRACT

A virtual device management system for wireless handheld devices such as tablets, smart phones, M2M, etc., based upon user initiated session, upon which a dedicated communication channel is established with the wireless device. The system includes processes and protocols employed in user initiation methods such as SMS, or data channel, queuing user sessions, routing user requests and establishment of dedicated communication channels for effective troubleshooting by authorized users and to compare device parameters against pre-defined set to generate a standards deviation report. A device client is resident on the mobile device non-volatile memory and is operable by the end user to invoke the application and initiate a request.

30 Claims, 12 Drawing Sheets

Figure 10  Boot-up:New Enrollment Process

Figure 13

USER INITIATED VIRTUAL MOBILE MANAGEMENT

PRIORITY CLAIM

This application is a continuation-in-part of U.S. patent application Ser. No. 12/550,742, filed Aug. 31, 2009 now abandoned, the entirety of which is incorporated herein by reference.

FIELD OF INVENTION

The present invention relates to mobile wireless communication devices, systems, networks, and methods of operation. This invention describes remote management of the mobile devices when a user initiates the trouble ticket request. This invention also deals with the various modes for the user to request remote support.

BACKGROUND OF INVENTION

Wireless handheld devices typically communicate with each other over commonly defined standards based wireless protocols. These devices are typically untethered, unlike wired communication devices such as telephones. Wireless operators provide the wireless networking infrastructure and provide service to the end customer. The customer subscribes for such a service from the operators who in turn guarantee a certain degree of quality of service to their customers.

Wireless handhelds are increasingly becoming more powerful and multi-functional with advancements in hardware and operating systems components, thus providing application developers a common set of programming interfaces or APIs to create rich interactive applications. These applications are either pre-installed prior to commercial shipment or downloaded over-the-air by the customer. Due to the varied complexity of these "smart" device and the applications that execute within them, customer seeks operator's support to troubleshoot their devices.

Virtual Mobile Management (VMM) is a tool used by the Help Desk Administrators and other technicians to access user's Mobile Device for support purposes. When VMM is active the support personnel can do one of two things: 1) Observe activity on a user's Mobile Device or 2) Take control of a user's Mobile Device directly and perform a task or correct a problem. VMM is an extremely valuable support tool. The ability to observe activity on a user's mobile device allows support personnel to quickly pinpoint the source of a user's problem and provide proper instructions to the user. The ability to take control of a user's mobile device remotely allows support personnel to quickly resolve complex system problems without having the user to bring the device into a repair facility. This all enhances user experience and effectively reduces customer support duration.

Although VMM offers the opportunity to dramatically improve support levels and enhance user experience, it also brings up issues of privacy. With this invention the user will have better control on the VMM as it allows the user to pause streaming when performing sensitive transactions. The user can directly make a connection with the Help Desk administrator for resolution of any kind of issue that the user has on the mobile device.

The customer care organization may require troubleshooting software to provide effective customer support. It may be advantageous to provide an apparatus that provides remote control and diagnostic capabilities to the customer care for effective troubleshooting.

SUMMARY OF THE INVENTION

Disclosed is a user initiated virtual device mobile management system for wireless handheld devices such as tables, smart phones, M2M and so forth based upon user initiated session, upon which a dedicated communication channel is established with the wireless device. The system includes processes and protocols employed in user initiation methods such as SMS, or data channel, queuing user sessions, routing user requests and establishment of dedicated communication channels for effective troubleshooting by authorized users and to compare device parameters against pre-defined set to generate a standards deviation report. A device client is resident on the mobile device non-volatile memory and is operable by the end user to invoke the application and initiate a request.

An objective of the invention is to provide virtual device management of wireless handheld devices.

Another objective of the invention is to provide a method and module that enables a user to initiate a virtual mobile management for a remote control session.

Still another objective of the invention is system that controls the call flows and architecture from the client side and server side to support user initiated virtual mobile management.

Another objective of the invention is to enhance user experience in a user initiated virtual mobile management process.

Still another objective of the invention is to provide a tool that allows a customer care representative to remotely view and control wireless handheld devices.

Another objective of the invention is to teach the use of a user initiated virtual mobile management process wherein the user can manage a mobile telephone device without a live session.

Another objective of the invention is to provide a virtual mobile management process wherein a telecommand can be used to obtain mobile telephony device information regarding processor, memory, data settings, e-mail settings and applications installed without any user intervention.

Yet another objective of the invention is to provide the user with different connection modes to establish a VMM session wherein the connection mode is short message service (SMS), an interactive voice response (IVR), of an internet protocol for prompting the user to initiate a remote control session.

Another objective of the invention is to perform a reset of e-mail settings, a reset of data settings, a phone reset, a backup of phone data, a backup of contacts, and roaming activation.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto In a first embodiment, the client on the device will provide the user with all the options that are available to contact the Help Desk. Each Query (Support Request) will go to the Message Router. The Message Router will route the messages in the queue to the Event Dispatcher to process the user initiated request. The Event Dispatcher then dispatches the request to the appropriate group for troubleshooting.

The User can have different options for requesting Remote support from the Help Desk like Data Connectivity issues, Device Configuration issues, Account Details, Billing request etc. The connection mode can be SMS (Short Message Service), IVR (Interactive Voice Response) or IP (Internet Protocol) Connection. Every user initiated request can be routed to an appropriate group in the Help Desk. The client residing on the device can provide different options for support requests. The Help desk administrator, based on the connection request type that is made by the user can decide whether it requires manual intervention or not. If manual intervention is required then the Admin can choose to start a Remote Control session with the device or send telecommands to resolve the issues. If manual intervention is not required then user can choose Interactive Voice Response (IVR) to select the type of support that is required.

User Initiated Session for Remote Control Using IP Connection

Every User Initiated Query, which needs a Remote Control Session or a Live Customer Support Representative (CSR), will be queued in the Admin Server. The Message Router will then route the message to the appropriate CSR with the help of the Event Dispatcher. Every CSR will be notified that a user initiated session is in queue. Any CSR who is ready to support the user in the queue will request for Remote Control and the session waiting status will be removed from the queue to notify the other CSRs that the session is being already attended. The CSR can request from the device the following information using Scripts/Telecommands during a Remote Control Session (not limited to the ones mentioned below): Processor Information; Memory Information; Data Settings; E-mail Settings; and Applications Installed User Initiated Session through IVR Interactive Voice Response is a general term for mobile phone-based voice value-added services. By dialing a designated number, mobile phone users able to listen and choose the help options from the Help Desk without any manual intervention.

The user calls the IVR system; the IVR system prompts the user to enter the Account Password. Once the User Account is verified the IVR prompts the user for all options that are available for remote support like (not limited to the ones mentioned below):

Reset E-mail Settings; Reset Data Settings; Reset Phone; Backup Phone Data; Backup Contacts; and Activate Roaming. Each task is accomplished by pushing Scripts/Telecommands to the device which can execute remotely on the device without any user intervention.

User Initiated Session through SMS, Short Message Service (SMS) is a communications protocol allowing the interchange of short text messages between mobile telephony devices. The user has to initiate a support request with the Help Desk through SMS.

The user can initiate a support request either for a Remote Control Session or request the Help Desk to do the following without having a live session: Reset E-mail Settings; Reset Data Settings; Reset Phone; Backup Phone Data; Backup Contacts; and Activate Roaming. Each task is accomplished by pushing Scripts/Telecommands to the device which can execute remotely on the device without any user intervention.

Whenever a User initiates a session the session will be queued in the Message Router. The Message Router, based on the type of a session that has been requested, routes the message to the appropriate CSR Group through the Event Dispatcher. Each CSR group will have set of technician consoles. Every console will be notified immediately of a session waiting status Any CSR who is ready to support the user who is in the queue will request for VMM and the session waiting status will be removed from the queue to notify the other CSRs that the session is being already attended.

After every issue has been resolved the CSR can do a survey with the user as to how well the problem was resolved. Survey can be done by sending a Survey banner to the user to provide feedback.

Figure 1:
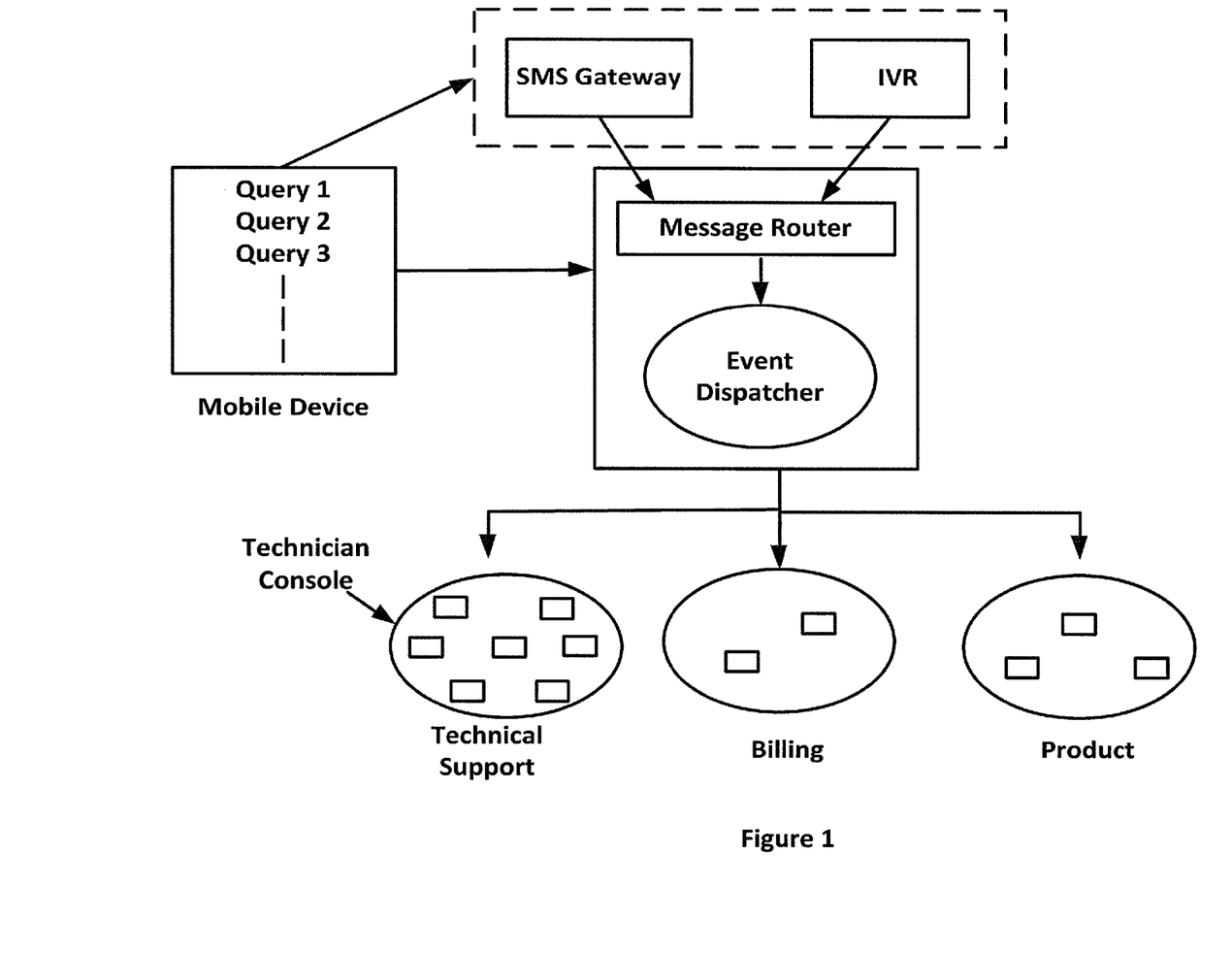
FIG. 1 is the User Initiated Session—architecture.
Figure 2:
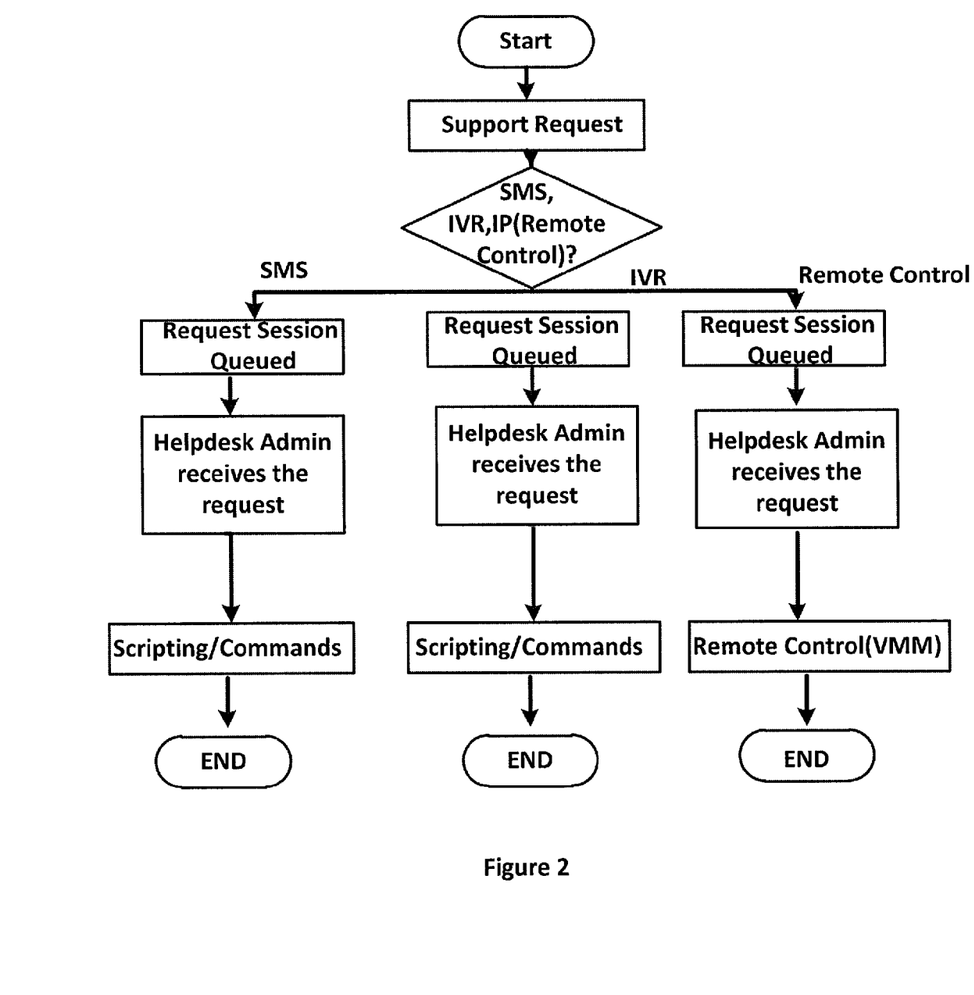
FIG. 2 is a flow diagram of the call flow.
Figure 3:
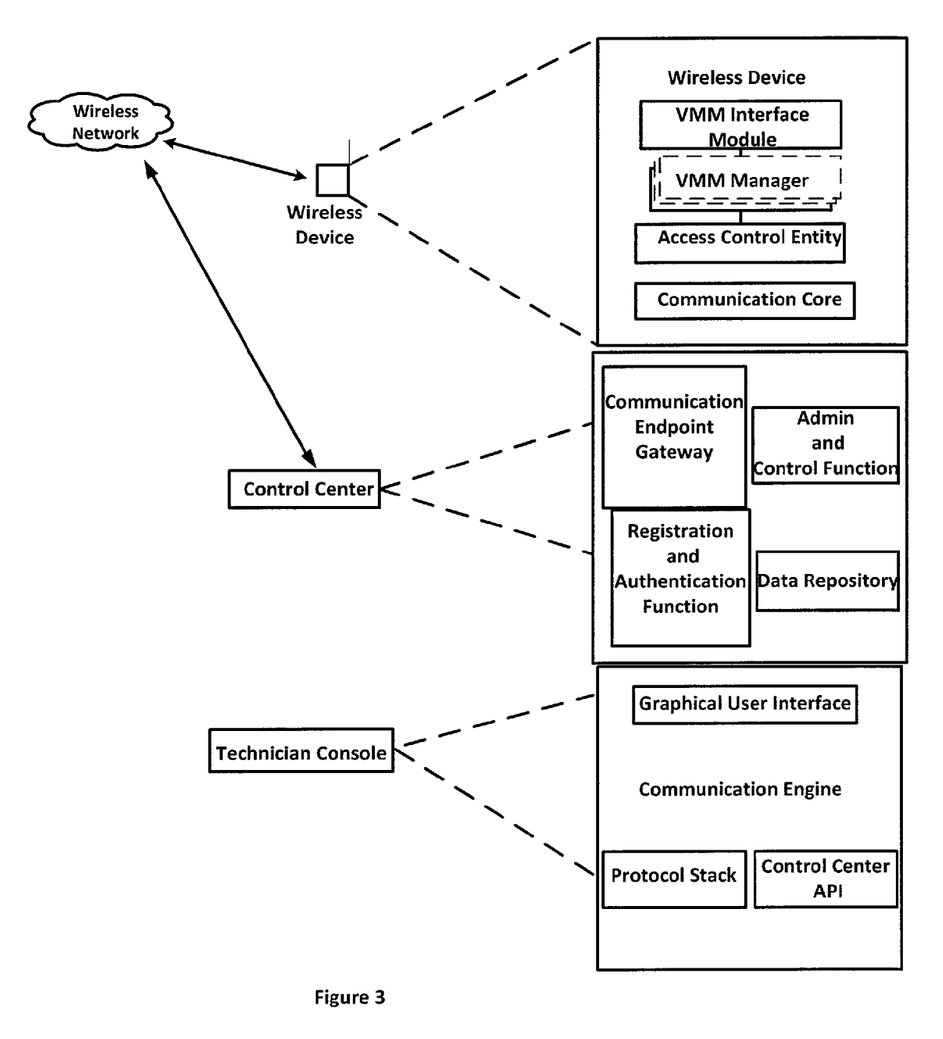
FIG. 3 is the system architecture for the preferred embodiment of the Virtual Mobile Management Remote Control.

Referring now to FIG. 3, the Virtual Mobile Management Remote Control (VMM-RC) is a powerful tool designed to be used by the customer care representatives to remotely view and control the mobile devices. In a preferred embodiment, the key components of the VMM-RC system include: Technician Console where care agents interact with the remote devices; Control Center Services, are responsible for the data management (DB Servers), device management, web services, analytics, security management and administrative services; and Device Connection Management servers are responsible to maintain the live remote data connection with the mobile devices.

The primary responsibility of the Communication End Point Gateway is to manage the device connections within the system. The server provides communication endpoints between Control Center (Technician Console, Admin and Control Function) and the device. This allows for multiple requests to be serviced within one session from multiple consoles. The Communication End Point Gateway provides a consistent manner of device connection and Tool service in a system with heterogeneous devices running different operating systems. The Communication End Point Gateway provides load balancing across multiple Connection Handlers on each Communication End Point Gateway Server in order to minimize single point of failure.

Figure 4:
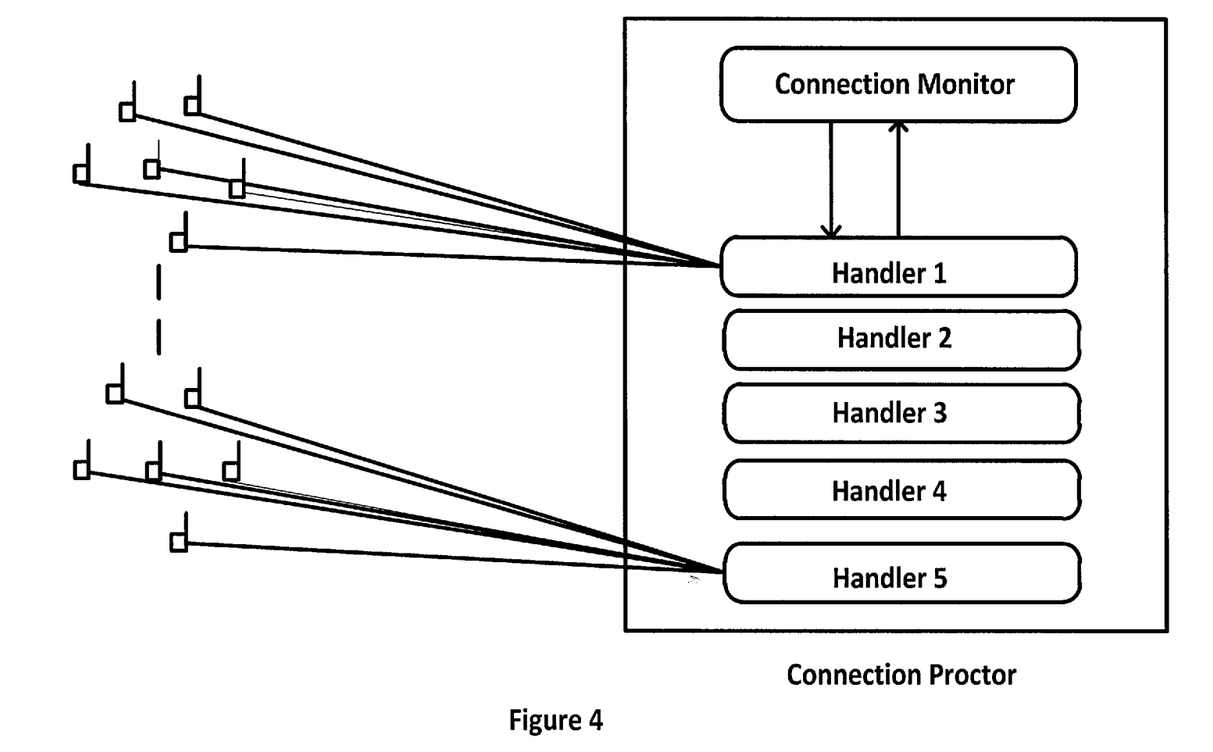
FIG. 4 is a pictorial of the Connection Monitor.

Referring to FIG. 4, the Connection End Point Gateway server is comprised of two components, the Connection Monitor and the Connection Handler. The Connection Monitor: Creates and manages Connection Handlers; Creates Session ID for new connection request; and Monitors all the scheduled and existing sessions.

The Connection Handler is setup for every Connection Proctor, where the number of Connection Handlers is configurable. All the sessions are load distributed across the Connection Handler. Each handler handles multiple device sessions.

The Admin and Control Function responsibility is to administer and manage all types of communication between the Control Center and the client devices.

The Administrative Service is designed to be central administration entity of the entire virtual mobile management system. Through this service, system administrators perform administration, management and instrumentation all the servers within the system, create and maintain multiple tenants, assign tenant administrator roles, etc.

The Management Service provides the operational end point to the system. The primary functions of Management Service are: Load distribution among the CEG' Management of device registration; Administration of devices; Administration of users, zones, policies, roles, etc.; and Session Queuing.

The Management Entity component is responsible in providing the Management service with an in-memory data store for key operational data such as ACL, user/group/zone structures, etc.

The Service Coordinator component coordinates the communication between various elements within the System. It provides the database interface to the Registration and Authentication Function in the Control Center. All services register themselves with this service. This service is responsible for service discovery.

The Registration and Authentication Function provides a single point of entry for all devices for enrollment and authentication services during VMM-RC session. It comprises of the following components:

Registration Service: During Auto-Enrollment, devices are required to register themselves with this service, prior to enrolling themselves.

Enrollment Service: This service is responsible to enroll registered devices with the system. Enrollment process is defined in detail in the later sections of the document.

Software Update: This service manages the various client packages in the system. Devices connect to this service to request for client update. If an update is available, the service will provide the appropriate client download link.

Device Management: This service provides the enrolled devices an interface to update its parameters in the system such as MDN when the device detects a change.

Anchor Admin: This service provides the administration component.

Figure 5:
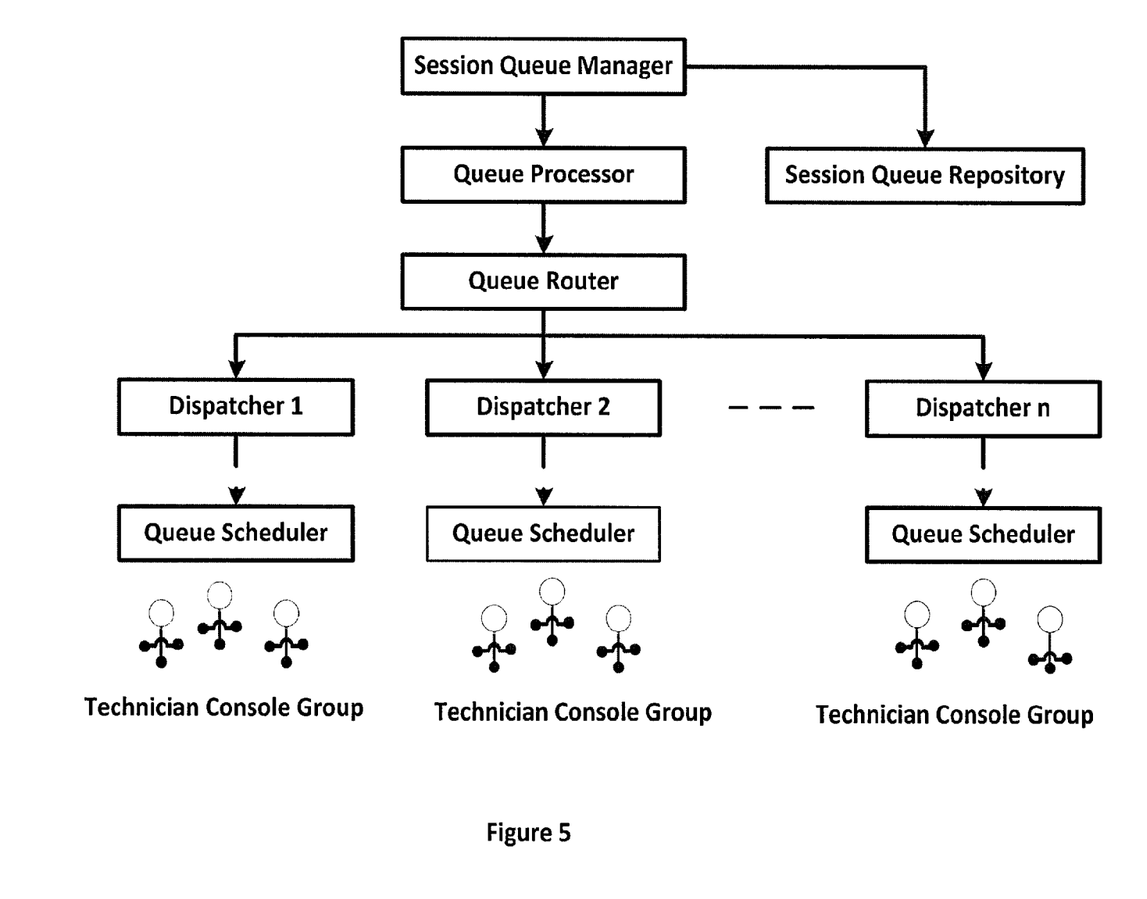
FIG. 5 is a flow diagram of the Session Queue Manager.
Figure 6:
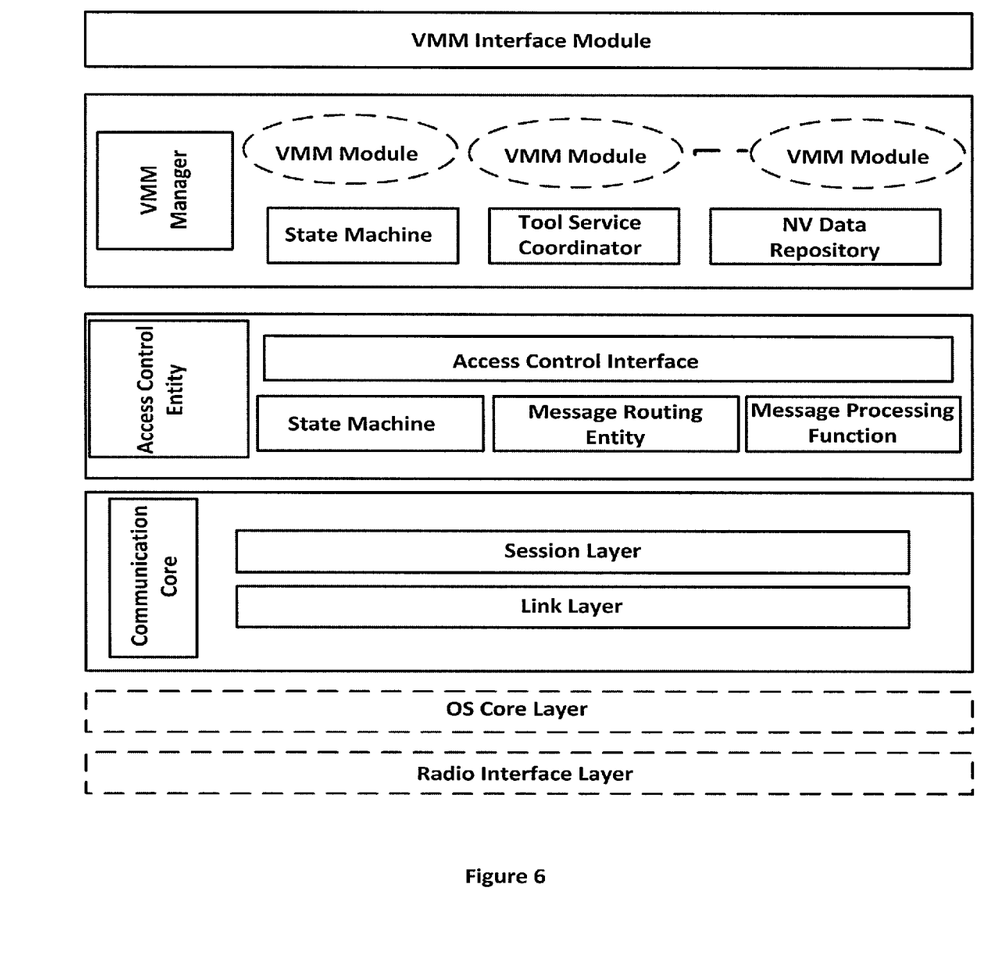
FIG. 6 is the client architecture for user initiated virtual mobile management remote control.

Referring to FIG. 5, the Session Queuing Manager takes all the incoming User Initiated VMM-RC connection requests and stores them into the Session Queue Repository to be later processed by the Queue Processor. The Queue processor gets notified by the Session Queue Manager that a new incoming session is in the session repository. Queuing processor processes the session request, determines the device request and forwards it to the Queue Router. Queuing Router determines the corresponding dispatcher. The dispatcher schedules the request to be serviced by the technician console. Finally the Technician console receives the request and authenticates the user and further proceeds with the VMM-RC session.

A Data Repository module stores all the information about the VMM-RC Mobile devices, server configuration, tasks and status settings. These databases are pivotal to configure and update managed devices and server components. It is also responsible to maintain the user login information as well as device authentication information.

The system comprises of 3 database elements: The Admin DB maintains all the system configurations, tenant configuration and management information, system administration and server instrumentation data and is accessed by the AetherPal System Admin Service. The Ops DB maintains data that is required for the operations of the system such as device enrollment, Access Control List (ACL), groups, users, zones, etc and is accessed by the AetherPal Management Service and the Service Coordinator.

The Reports DB Contains Historical Data of Device Enrollment, Session, Audit, Report Views, etc.

Figure 7:
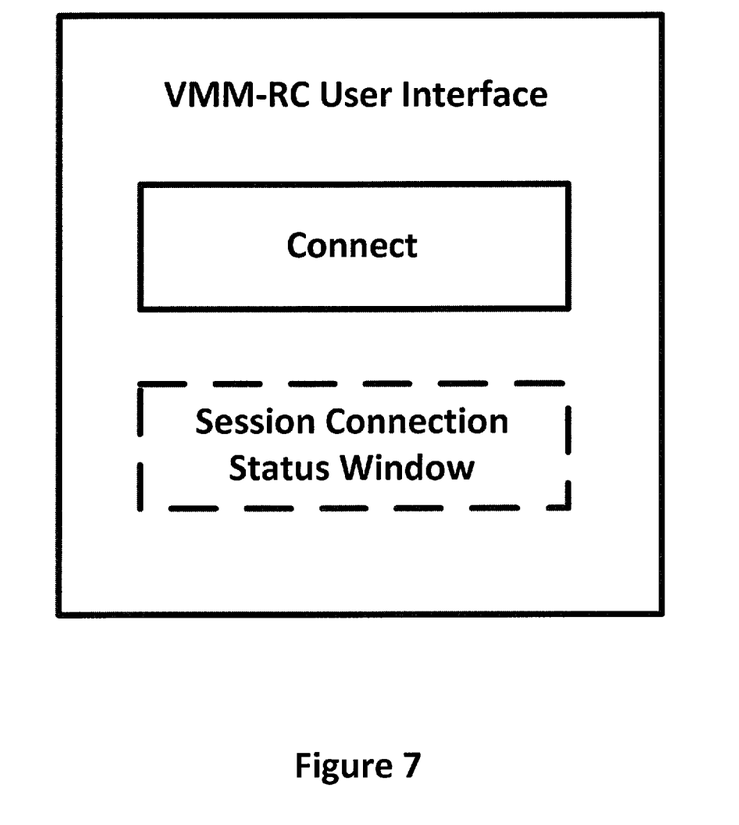
FIG. 7 is an illustration of the Virtual Mobile Management User Interface.

Referring now to FIG. 7, set forth is an illustration of the Virtual Mobile Management User Interface. The Interface Module provides a consistent and standard Application Programming Interface or API to the VMM User Interface. The VMM Interface module exposes synchronous as well as asynchronous function calls, by which the VMM User Interface interacts with the application stack. The Interface also provides a callback mechanism to the VMM user interface for asynchronous communication The virtual mobile management manger includes various modules. The VMM Module which provide a multitude of tool services. Tool Services are grouped together that exhibit common functionality such as Remote Control, File Manager, Device Management, and so forth.

The State Machine module maintains an instance of the state machine. A State Machine defines a set of shared states that the tool service on the device application shares with the server.

The Tool Service Coordinator module maintains a collection of active tool service instances that are currently being serviced by the VMM application. This entity maintains the lifetime of all Tool Services, and is responsible in creating and destroying Tool Services.

The NV Data Repository module is used for authentication and authorization specific data that is shared between the VMM application and the server is maintained within the NV data repository. This data repository also serves the purpose of maintaining Tool Service configuration as well as VMM configuration data.

The Access Control Entity layer provides a set of functions to the Tool Services to communicate with the Control Center. It provides in the encapsulation of messages before forwarding it to the Communication Core. This layer is responsible to invoke an instance of the Communication Core layer and provides a state machine that defines the state of the VMM application.

Access Control Interface provides a set of standard Application Programmer Interface or API to the Tool Services. These APIs provide a consistent communication platform to facilitate both synchronous as well as asynchronous communication.

The ACI State Machine identifies the overall state of the VMM application. State transitions within the ACI State Machine triggers events that are handled by the VMM layer. The states are Open and Closed. Traffic flows through the ACI layer only in the Open State.

The Message Routing Entity is responsible for routing all signal messages, destined to Tool Services to the respective event handlers.

The Message Processing Function is a signal message preprocessor. This entity receives signal messages from the Session Layer destined towards Tool Services. It de-frames these messages prior to forwarding it to the Message Routing Entity to apply routing rules. Messages that are destined to the server from Tool Services are encapsulated here.

The Communication Core Layer is responsible to setup and maintain a dedicated communication channel with the Control Center. This layer provides the necessary framework to transport messages between the upper layers and the Control Center. It provides message encapsulation, framing, fragmentation and packet re-construction of Tool Service messages.

Figure 8:
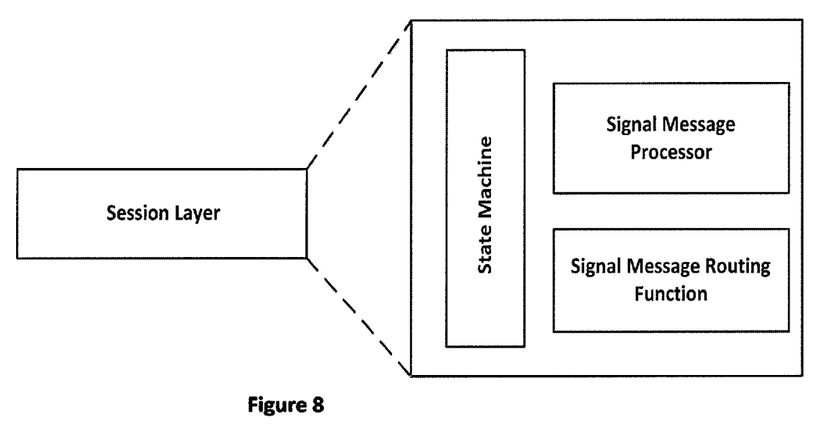
FIG. 8 is an illustration of the Session Layer.

Referring to FIG. 8, the session layer maintains a set of shared state between the Communication Endpoint Gateway (CEG) and the application. The session layer packets encapsulate signal messages that are transported between the CEG and the application. Each message within the session layer packet defines the source and destination to which the signal messages are to be delivered. The session layer consists of the following entities:

State Machine: The state machine maintains a state within a pre-defined set of shared states between the application and the CEG. State changes within the state machine trigger the execution of state transition procedures within the application.

Signal Message Processor: This entity is responsible to encapsulate and process signal messages that are transmitted between the CEG and the application. This entity is also responsible in influencing the state transition within the state machine by altering its state. Signal messages destined to VMM modules are forwarded to the Signal Message Routing Function.

Signal Message Routing Function: This entity is responsible to forward signal messages to the appropriate destination. Signal messages destined to VMM modules are directly forwarded to VVM Tool Service Coordinator. Signal messages destined to the CEG are forwarded to the link layer.

Figure 9:
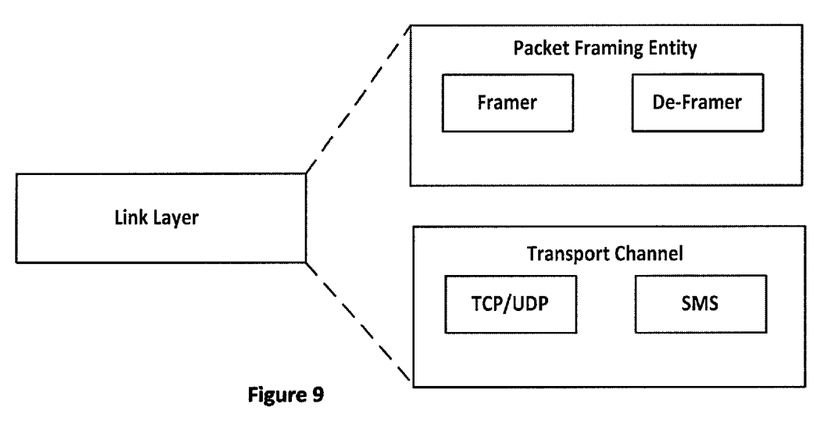
FIG. 9 is an illustration of the Link Layer.

Referring to FIG. 9, the link layer is responsible to establish and maintain a dedicated communication channel between the client and the CEG. The Link Layer encapsulates all messages within its frame prior to forwarding it to the network. Packets that are received by the Link Layer from the network are re-constructed and de-framed prior to forwarding it to the upper layer. The following components form the Link Layer. This layer checks for message integrity.

The Packet Framing Entity is responsible to encapsulate messages into Link Layer frames. These frames are then forwarded to the Transport Channel, to be forwarded to the network layer. When a network packet is received by the Packet Framing Entity, it inspects the packet and verifies the integrity of the packet. Malformed packets are silently discarded.

A Transport Channel binds to the appropriate transport layer of the underlying operating system, which is dependent upon the VMM Tool Service. It is responsible to forward messages to the network layer and receives messages from the network layer. It provides notification to the upper layer on the state of the network layer through asynchronous events.

Figure 10:
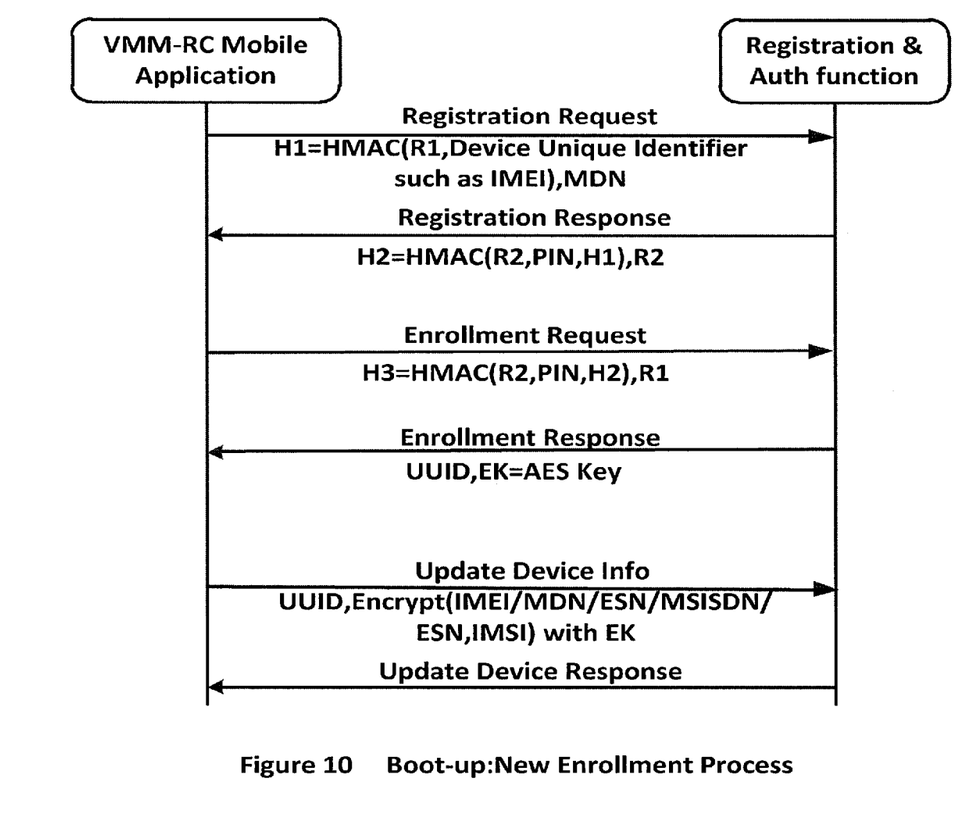
FIG. 10 is an illustration of the new enrollment process.

Referring to FIG. 10, illustrated is the Virtual Mobile Management-Remote Control (VMM-RC) procedure of how the User Initiated VMM-RC session is established with the server. The following describes different phases: Device Enrollment; User Initiated Session; End to End Session Establishment; and Graceful Termination of VMM-RC Session.

Device Enrollment, before a Mobile device can connect to the Server, it must establish itself as a known and authenticated object in the system. In general, this is accomplished in the following way: Mutual Authentication; Enrollment Request; and Enrollment Response.

Figure 11:
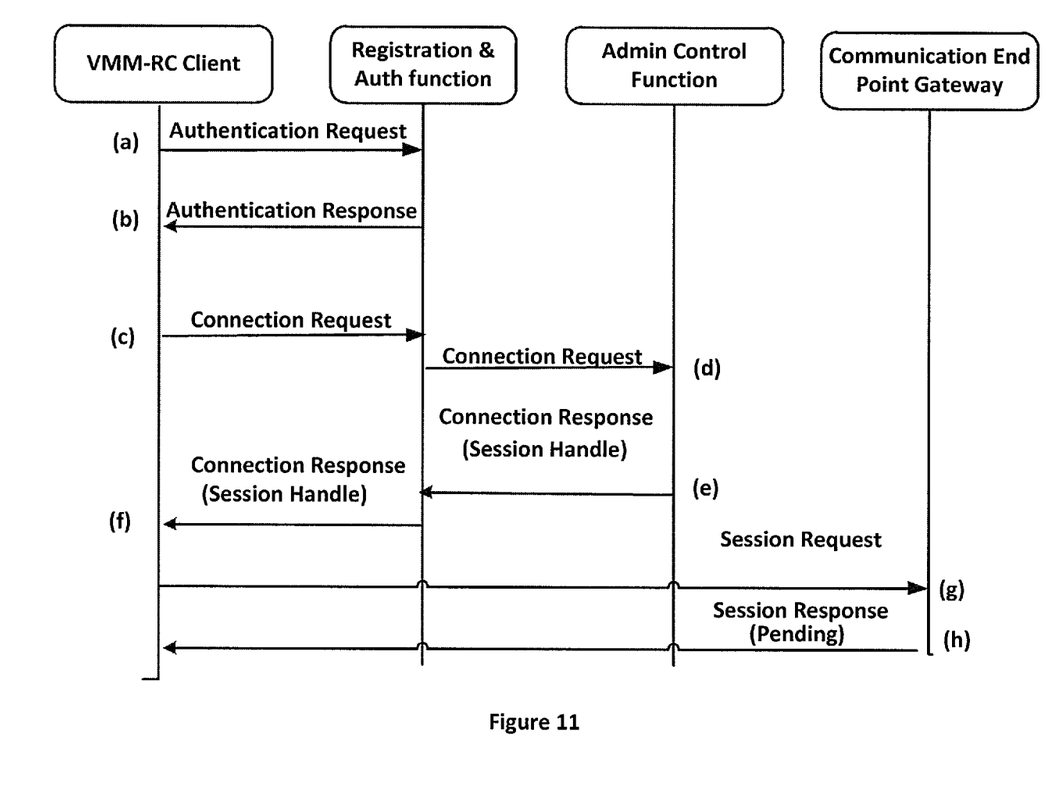
FIG. 11 is an illustration of the user initiated session.

If for any reason the enrollment failed the VMM-RC Mobile application shall retry the enrollment process at a later time. Referring to FIG. 11-U*ser* Initiated Session:

Step a & b: Once the User initiates a VMM-RC session from the mobile device the Session Queue Manager processes the request through a mutual authentication Step c, d, e, f: Once the authentication is successful the Connection Request is sent to the Server to retrieve an appropriate Session Handle Step g: Session Request is sent to the Communication End Point Gateway to open a session Step h: Communication End Point Gateway sends a response with "pending" as an indication to the client.

Figure 12:
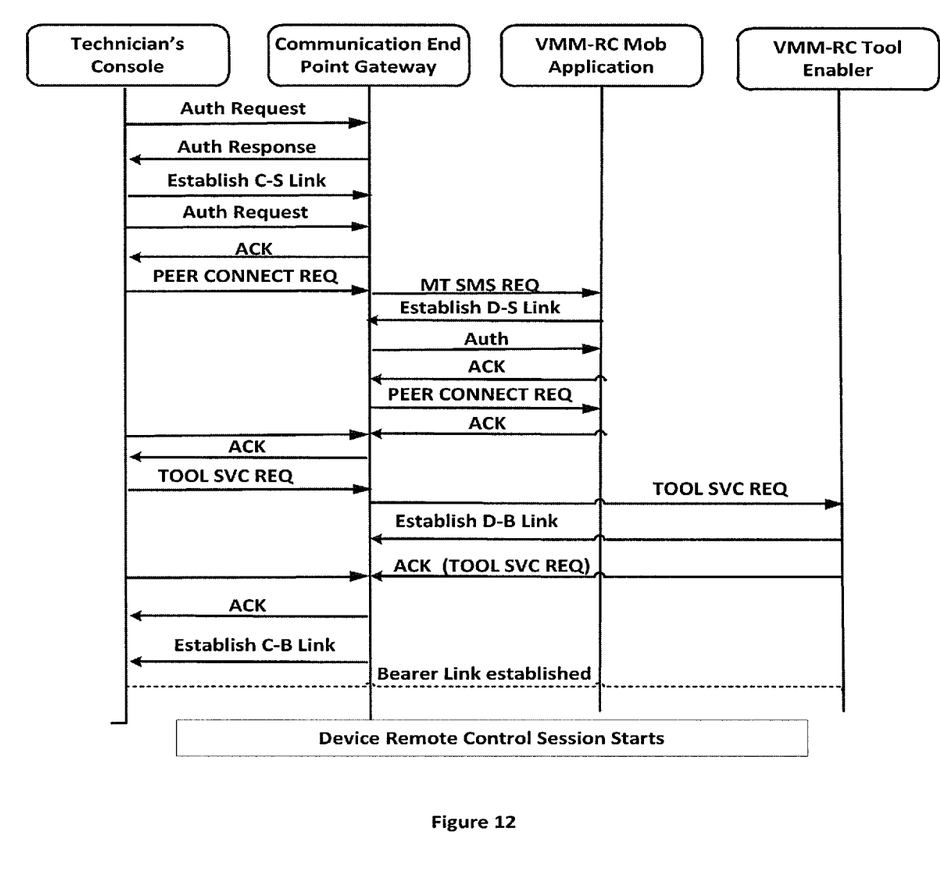
FIG. 12 is an illustration of the end to end session establishment.

Now the Technician Console will authorize the connection request and follows the next phase of the call flow, referring to FIG. 12.

Step a: When a Connection request is made for a VMM-RC connection, the technicians' Console authenticates with its peer Step b: Technician's console sends a PEER_CONNECT request to the Communication End Point Gateway Step c: The server authorizes the Connection Request and sends the PEER_CONNECT request to the relevant device Step d: When the client receives the PEER_CONNECT request message it has to send an ACK or NAK based on its current state Step f: Once the Server receives an ACK it will make the VMM-RC request with the Client Step g: Based on the response (ACK or NAK) the Communication End Point Gateway will establish a peer-to-peer connection or disconnect the session.

Figure 13:
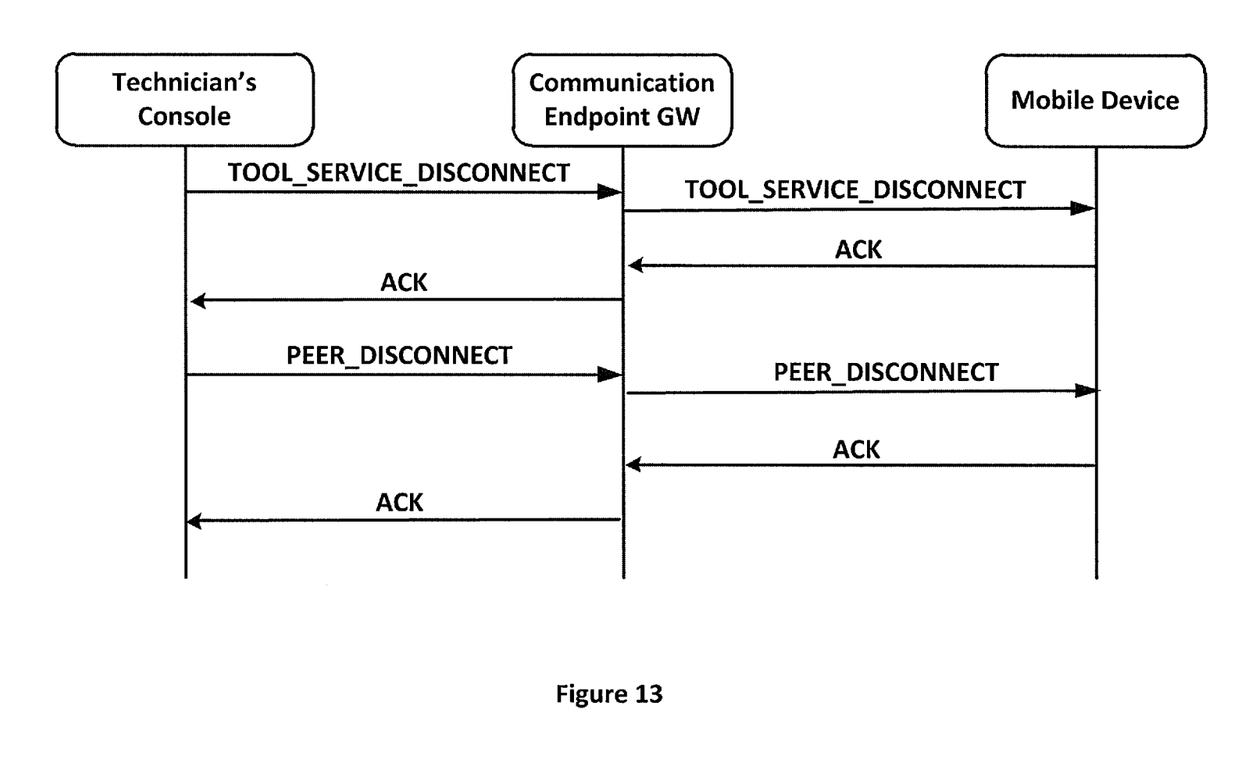
FIG. 13 is an illustration of the connection termination.

Referring to FIG. 13, after the session is complete the Mobile device client and Server gracefully terminates the connection.

User Initiated VMM-RC additional features include Re-Enrollment Process (SIM/MDN Change). For any SIM/MDN change the device will reboot as part of the standard procedure. Hence during boot-up the VMM-RC Mobile application shall detect the below changes: Device is previously Enrolled; SIM/MDN Change; Check for client upgrade before proceeding ahead with the re-enrollment process the VMM-RC Mobile application shall check if the data connectivity is available on the mobile device. Else it will retry at a later time.

VMM-RC Mobile Application Upgrade Process, before the enrollment process begins the VMM-RC Mobile Application checks with the server to see if there is any client upgrade required on the mobile device.

Query Device Information during VMM-RC, during the VMM-RC session the technician will be able to query device information like process list, list of applications installed/running on the device, device manufacturer details etc. from the mobile device in session.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

The invention claimed is:

1. A virtual mobile management system comprising:
a technician console for communicating with heterogeneous remote devices;

a control center for use in data management, device management, web services, analytics, security management and administrative services;

a session layer to maintain a set of shared state between a Communication Endpoint Gateway in the control center and an application, wherein session layer packets encapsulate signal messages that are transported between the Communication Endpoint Gateway and the application, wherein the session layer includes a state machine for maintaining a state within a pre-defined set of shared states between the Communication Endpoint Gateway and the application; and a device connection management server for maintaining a live remote data connection with said heterogeneous remote devices.

2. The virtual mobile management system according to claim 1 wherein said device connection management server includes a Communication End Point Gateway to manage the device connections within said system, said device connection management server provides communication endpoints between a Control Center and heterogeneous remote devices.

3. The virtual mobile management system according to claim 2 wherein said Communication End Point Gateway is further defined as a connection monitor and a connection handler.

4. The virtual mobile management system according to claim 3 wherein said Communication End Point Gateway provides load balancing across multiple Connection Handlers on each said Communication End Point Gateway Server in order to minimize single point of failure.

5. The virtual mobile management system according to claim 1 wherein said Control Center includes a Technician Console that provides a graphical user interface to manage and control said heterogeneous remote devices, said Technician Console performing tasks consisting of: performing pre-enrollment requests; managing all remote control RC Mobile devices; servicing the infrastructure of the Control center; and performing administrative tasks.

6. The virtual mobile management system according to claim 1 wherein said Control Center includes an Admin and Control Function to allow for multiple session requests to be serviced within one session from multiple consoles.

7. The virtual mobile management system according to claim 1 including a session queuing manager having a queuing processor and a session queue manager, said session queuing manager receiving a user initiated connection request;

notifying said queuing processor by said session queue manager that a new session request has been placed within a session repository;

determining a device request by processing through said queuing processor;

forwarding said device request to a queue router, said queue router determining a corresponding dispatcher;

scheduling said device request to be served by said technician console;

authenticating the user and implementing a virtual mobile management system session.

8. The virtual mobile management system according to claim 1 including a data repository module for storing information about remote devices, server configuration, tasks and status settings for configuring and updating managed devices and server components.

9. The virtual mobile management system according to claim 8 wherein said data repository module includes an Admin database for maintaining all the system configurations, tenant configuration and management information, system administration.

10. The virtual mobile management system according to claim 8 wherein said data repository module includes an Ops database for maintaining data that is required for the operations of the system such as device enrollment, Access Control List (ACL), groups, users, zones.

11. The virtual mobile management system according to claim 8 wherein said data repository module includes a Reports database which contains historical data of device enrollment, session, audit, and report views.

12. The virtual mobile management system according to claim 1, wherein said session includes a means for encapsulating and processing signal messages transmitted between the Communication Endpoint Gateway and the application and influencing a state transition within said state machine by altering its state.

13. A method for user initiated virtual mobile management (VMM), the method comprising:

establishing a connection mode between a remote device and a technician console, the remote device including a preformatted list of support request messages;

queuing of a message received from said remote device through a router;

dispatching a queued message to a control center for use in data management, device management, web services, analytics, security management and administrative services, wherein a session layer maintains a set of shared state between a Communication Endpoint Gateway and an application and wherein session layer packets encapsulate signal messages that are transported between the Communication Endpoint Gateway and the application, the session layer includes a state machine for maintaining a state within a pre-defined set of shared states between the Communication Endpoint Gateway and the application;

coupling to a device connection management server for maintaining a live remote data connection with said remote device;

determining a script in response to the queued message and pushing said script to said remote device; and executing said script without user intervention.

14. The method according to claim 13 wherein the connection mode is short message service (SMS), said connection mode allowing an interchange of text messages between mobile telephony devices to initiate a VMM session.

15. The method according to claim 13 wherein the connection mode is an interactive voice response (IVR), said connection mode prompting the user to choose from a list of options to initiate a VMM session.

16. The method according to claim 13 wherein the connection mode is an internet protocol, said connection mode prompting the user to choose from a list of options to initiate a VMM session.

17. The method according to claim 13 wherein said VMM session can perform a reset of e-mail settings, a reset of data settings, a phone reset, a backup of phone data, a backup of contacts, and activate roaming.

18. The method according to claim 13 wherein the connection mode is secure.

19. The method according to claim 13 wherein said help desk administrator routes said queued message to a group of live customer support representatives (CSR) notifying each CSR of a queued message waiting status, said queued message waiting status remove from the queue when a first CSR attends the message.

20. The method according to claim 13 wherein said device connection management server includes the Communication End Point Gateway to manage the device connections within said system, said device connection management server provides communication endpoints between the Control Center and heterogeneous remote devices.

21. The method according to claim 20 wherein said Communication End Point Gateway is further defined as a connection monitor and a connection handler.

22. The method according to claim 21 wherein said Communication End Point Gateway provides load balancing across multiple Connection Handlers on each said Communication End Point Gateway Server in order to minimize single point of failure.

23. The method according to claim 13 wherein said Control Center includes a Technician Console that provides a graphical user interface to manage and control said remote devices, said Technician Console performing tasks consisting of: performing pre-enrollment requests; servicing the infrastructure of the Control center; and performing administrative tasks.

24. The method according to claim 13 wherein said Control Center includes an Admin and Control Function to allow for multiple session requests to be serviced within one session from multiple consoles.

25. The method according to claim 13 including a session queuing manager having a queuing processor and a session queue manager, said session queuing manager receiving a user initiated connection request;

notifying said queuing processor by said session queue manager that a new session request has been placed within a session repository;

determining a device request by processing through said queuing processor;

forwarding said device request to a queue router, said queue router determining a corresponding dispatcher;

scheduling said device request to be served by said technician console; and authenticating the user and implementing a virtual mobile management system session.

26. The method according to claim 13 including a data repository module for storing information about remote devices, server configuration, tasks and status settings for configuring and updating managed devices and server components.

27. The method according to claim 26 wherein said data repository module includes an Admin database for maintains all the system configurations, tenant configuration and management information, system administration.

28. The method according to claim 26 wherein said data repository module includes an Ops database for maintaining data that is required for the operations of the system such as device enrollment, Access Control List (ACL), groups, users, zones.

29. The method according to claim 26 wherein said data repository module includes a Reports database which contains historical data of device enrollment, session, audit, and report views.

30. The method according to claim 13, wherein said session includes a means for encapsulating and processing signal messages transmitted between the Communication Endpoint Gateway and the application and influencing a state transition within said state machine by altering its state.

* * * * *